US011451111B2

(12) United States Patent
Traub et al.

(10) Patent No.: US 11,451,111 B2
(45) Date of Patent: Sep. 20, 2022

(54) COMBINATION OF MOTOR CASING AND PLUG CONNECTION AND DEDICATED MOTOR CASING

(71) Applicant: Webasto SE, Stockdorf (DE)

(72) Inventors: Martin Traub, Stockdorf (DE); Werner Lissner, Stockdorf (DE)

(73) Assignee: WEBASTO SE, Stockdorf (DE)

(*) Notice: Subject to any disclaimer, the term of this patent is extended or adjusted under 35 U.S.C. 154(b) by 0 days.

(21) Appl. No.: 16/312,533

(22) PCT Filed: Jun. 28, 2017

(86) PCT No.: PCT/EP2017/066048
§ 371 (c)(1),
(2) Date: Dec. 21, 2018

(87) PCT Pub. No.: WO2018/002168
PCT Pub. Date: Jan. 4, 2018

(65) Prior Publication Data
US 2019/0260261 A1 Aug. 22, 2019

(30) Foreign Application Priority Data

Jul. 1, 2016 (DE) ...................... 10 2016 112 109.6

(51) Int. Cl.
H02K 5/24 (2006.01)
B60R 16/02 (2006.01)
H01R 13/533 (2006.01)
H02K 5/22 (2006.01)

(52) U.S. Cl.
CPC .............. *H02K 5/24* (2013.01); *B60R 16/02* (2013.01); *H01R 13/533* (2013.01); *H02K 5/225* (2013.01); *H01R 2201/26* (2013.01)

(58) Field of Classification Search
CPC .................................................... H02K 5/225

USPC .......................................................... 310/71
See application file for complete search history.

(56) References Cited

U.S. PATENT DOCUMENTS 6,127,752 A * 10/2000 Wiesler ................. B60J 7/0573
310/238
6,404,086 B1 6/2002 Fukasaku et al.
6,786,540 B2 9/2004 Friedrich et al.
7,579,730 B2 * 8/2009 Sakohira ................ H02K 5/148
310/239

(Continued)

FOREIGN PATENT DOCUMENTS

DE 102009054590 A1 * 6/2011 ............. H02K 5/225
DE 102012022170 A1 5/2014

(Continued)

OTHER PUBLICATIONS

Machine Translation, Herzberger, DE-102009054590-A1, Jun. 2011. (Year: 2011).*

*Primary Examiner* — Thomas Truong
(74) *Attorney, Agent, or Firm* — Quarles & Brady LLP

(57) ABSTRACT

A combination of a motor casing and a plug connection, the motor casing being designed for a drive of movable components of a vehicle, in particular sunroofs, blinds or roofs of convertibles. A plug connection is inserted in the motor casing and a gap is provided between the motor casing and the plug connection. At least one projection is provided in the area of the gap and avoids play between the motor casing and the plug connection.

11 Claims, 2 Drawing Sheets

(56) References Cited

U.S. PATENT DOCUMENTS

| | | | | |
|---|---|---|---|---|
| 2006/0113852 A1* | 6/2006 | Adachi | ............ | H02K 5/225 310/71 |
| 2009/0295325 A1* | 12/2009 | Sekine | ............ | B62D 5/0409 318/646 |
| 2012/0112579 A1* | 5/2012 | Kokubu | ............ | H02K 5/225 310/71 |
| 2014/0240931 A1 | 8/2014 | Rosenthal et al. | | |

FOREIGN PATENT DOCUMENTS

| | | |
|---|---|---|
| DE | 102009020075 B4 | 10/2014 |
| DE | 102014215222 A1 | 2/2016 |
| DE | 102014215231 A1 | 2/2016 |
| EP | 0698946 A1 | 2/1996 |
| JP | H118026 A | 1/1999 |
| JP | 2004328942 A | 11/2004 |
| JP | 2010177112 A | 8/2010 |
| JP | 2012105381 A | 5/2012 |
| WO | 2006069564 A2 | 7/2006 |
| WO | 2012123108 A2 | 9/2012 |
| WO | 2015080105 A1 | 6/2015 |

* cited by examiner

COMBINATION OF MOTOR CASING AND PLUG CONNECTION AND DEDICATED MOTOR CASING

CROSS-REFERENCE TO RELATED APPLICATIONS

This application represents the national stage entry of PCT International Application No. PCT/EP2017/066048 filed on Jun. 28, 2017, which claims the benefit of German Patent Application No. 10 2016 112 109.6 filed on Jul. 1, 2016, the entire contents of which are incorporated herein by reference for all purposes.

The invention relates to a combination of a motor housing and a plug connection, wherein the motor housing is provided for a drive means for movable components of a vehicle, in particular sun roofs, blinds, or convertible roofs, wherein a plug connection is inserted into the motor housing and wherein a gap is provided between the motor housing and the plug connection.

The invention moreover relates to a motor housing.

In connection with equipping vehicles of any type, in particular motor vehicles, with technology, efforts are made to avoid combinations of parts which rattle or vibrate against one another. Disruptive noises are caused by rattling or vibration when driving. The relative movements of parts which accompany the rattling or vibration moreover cause increased wear of the parts and other components connected thereto.

These basic efforts are also made in the specific technical field of electrical drive means for movable components of a vehicle, in particular sun roofs, blinds, or convertible roofs. The said drive means are arranged in a motor housing. One or more plug connections are provided on the motor housing for electrically connecting the electrical drive means and/or for transmitting electrical signals. Such a plug connection generally has a separate housing which, like the motor housing, is usually manufactured from plastic. In order to mount the plug connection on the motor housing, the latter has an opening into which the plug connection can be inserted. In order to enable this with a certain tolerance, the opening in the motor housing is designed so that it is somewhat greater than the external dimensions of the plug connection so that at least one gap results between the plug connection and the motor housing. Even when this gap is desired per se precisely for the purpose of compensating certain tolerances and/or facilitating the mounting of the plug connection on the motor housing, it does ultimately result in the abovementioned fundamental problems, namely rattling and/or vibration occurs between the plug connection and the motor housing, which is not desired.

In order to overcome this problem, a damping element is often placed in the gap, for example a felt piece. Thus, although in principle an arrangement of a motor housing and a plug connection is provided in which rattling and vibration is avoided, the measure by which this is achieved nevertheless requires more complex mounting and at least one additional part, namely the felt piece. It may also occur that the felt piece becomes worn or is lost after a certain service life, such that it is then no longer able to fulfill its purpose, namely avoiding rattling and/or vibration.

FIG. 2 shows a combination of a motor housing 10' and a plug connection 12' from the prior art. The motor housing 10' has a two-part design, wherein it has a motor housing upper part 20' and a motor housing lower part 22'. The plug connection 12' is inserted into an opening 24'. A gap 14' is formed between the plug connection 12' and the motor housing 10'. This gap 14' is very narrow and cannot be seen in the drawing but its position is clearly defined by the reference numeral 14'.

The object of the invention is to provide a combination of a motor housing and a plug connection, and a dedicated motor housing, such that the abovementioned problems are avoided. It is intended that rattling and/or vibration are in principle excluded; it is moreover intended that this is ensured throughout the lifetime of the combination of the motor housing and the plug connection, wherein a reduction in costs, relating to the complexity of the mounting and the parts, is in particular also desired.

This object is achieved by the features of the independent claim.

Advantageous embodiments of the invention are provided in the dependent claims.

The invention builds on the generic prior art by at least one projection, which prevents play between the motor housing and the plug connection, being provided in the region of the gap. Any rattling and/or vibration between the components is prevented by this projection. The projection does not become worn and cannot become lost. A felt piece which is fitted into the gap according to the prior art is then unnecessary.

The invention is advantageously developed by the at least one projection being designed as at least one rib. A rib can reliably provide a bearing point over its entire length and in this way can prevent rattling and/or vibration.

It is preferred if the projection is provided on the motor housing. It is likewise possible to provide the projection on the plug connection. However, because standard components are often used as plug connections, whilst the motor housing is designed and manufactured specifically for its application, it is preferred to choose the arrangement of the projection or the rib on the motor housing.

It is furthermore advantageous if the at least one rib extends in a direction in which the plug connection is inserted into the motor housing when the latter is mounted. The force which acts between the motor housing and the plug connection is consequently distributed over a relatively large area in the motor housing. This improves the reliable bearing of the components against one another.

It is furthermore preferred if the at least one projection is designed as a single piece with the motor housing. The projection can also be fastened subsequently on the finished motor housing, for example by an adhesive connection. The one-piece formation of the motor housing with a projection is, however, preferred because the mounting is facilitated thereby. The projection moreover cannot become detached from the motor housing.

It is usefully provided that the at least one projection provides a force-fit between the motor housing and the plug connection. In this way, the projection causes in particular an "over-pressing". This is accompanied by a slight deformation of the motor housing and/or the plug connection.

It can likewise be provided that the at least one projection provides a form-fit between the motor housing and the plug connection. A form-fit and a force-fit can of course also be formed at the same time. If there is an arrangement with just a form-fit, rattling and vibration can then be prevented, any deformation of the components involved then being prevented.

The invention furthermore relates to a motor housing with at least one projection which is designed such that the motor housing can be used as components of the abovedefined combination of motor housing and plug connection.

The invention will now be explained by way of example with reference to the accompanying drawings, in which.

Figure 2:
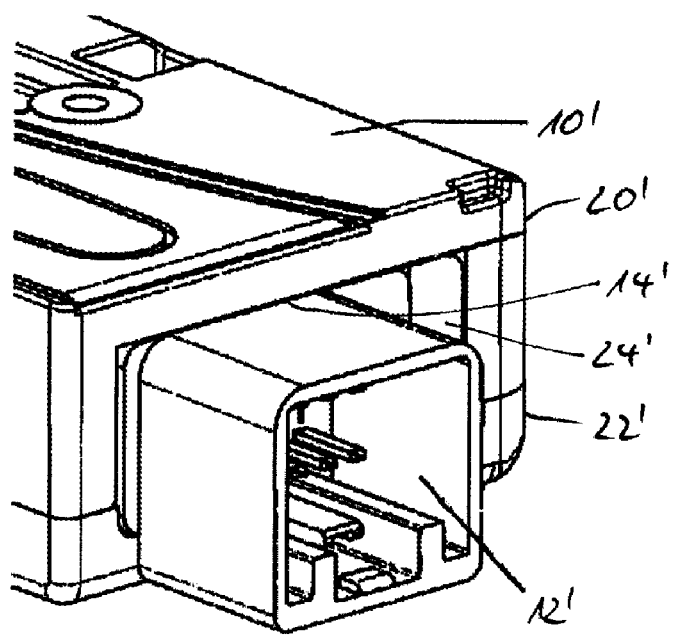
FIG. 2 shows a perspective partial view of a combination of a motor housing and a plug connection according to the prior art.

In the subsequent description of the preferred embodiment, reference numerals are used which are associated with the reference numerals which were used in the above description of the prior art with the aid of FIG. 2. If, for example, the reference numeral 10' has been used in connection with the prior art for the motor housing, the reference numeral 10 will be found at this point below. As a result, the combination according to the invention of a motor housing and a plug connection, and its development from the prior art, can be described in an illuminating way.

Figure 1:
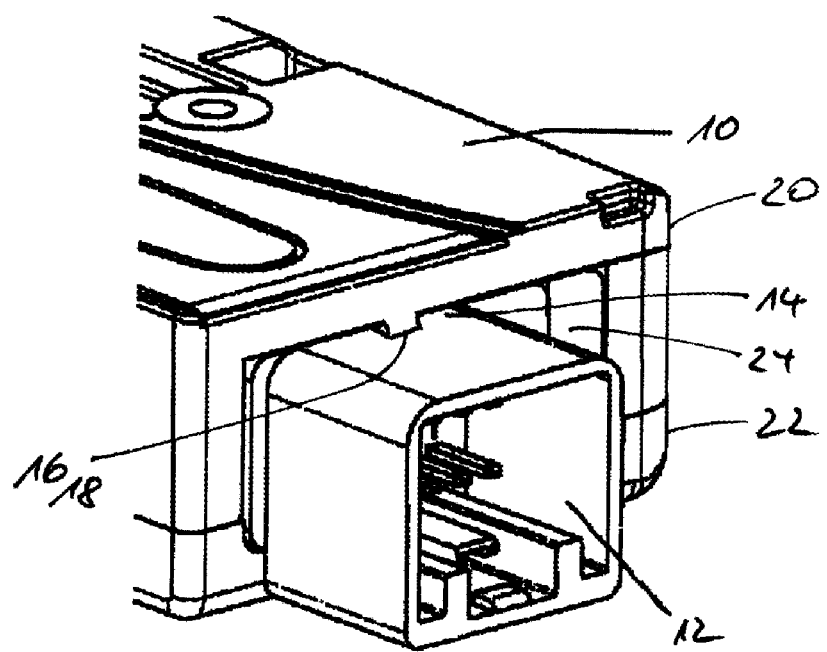
FIG. 1 shows a perspective partial view of a combination of a motor housing and a plug connection according to the present invention.

FIG. 1 shows a partial perspective view of a combination of a motor housing 10 and a plug connection 12. The motor housing 10 comprises a motor housing upper part 20 and a motor housing lower part 22. It is also within the scope of the present invention for the motor housing to be in a single piece. The motor housing 10 provides an opening 24 into which the plug connection 12 can be inserted. A gap 14, which if no other measures existed would cause the problems of the prior art, remains between the plug connection 12 and the motor housing. According to the invention, it is, however, now provided that a projection 16 or a rib 18 is provided in the region of this gap 14. In the preferred embodiment, it is designed so that it extends in elongated fashion in the plugging-in direction of the plug connection 12. The rib 18 is a component which is formed integrally with the motor housing 10. When the plug connection 12 is inserted, it bears with a form-fit and a force-fit against the plug connection 12.

The features of the invention which are disclosed in the above description, in the drawings, and in the claims can be essential for realizing the invention both individually and in any combination.

LIST OF REFERENCE NUMERALS

10 motor housing
12 plug connection
14 gap
16 projection
18 rib
20 motor housing upper part
22 motor housing lower part
24 opening
10' motor housing
12' plug connection
14' gap
20' motor housing upper part
22' motor housing lower part
24' opening

The invention claimed is:

1. A combination of a motor housing and a plug connection, wherein the motor housing is provided for a motor to drive movable components of a vehicle, wherein an outer housing of the plug connection is inserted into the motor housing along an insertion direction and wherein a gap is provided between the motor housing and the outer housing of the plug connection in a direction perpendicular to the insertion direction, wherein at least one elongate projection provided on the motor housing extends into the gap perpendicular to the direction of insertion, the at least one elongate projection slidably bearing on and distributing force between the motor housing and the outer housing of the plug connection to prevent play between the motor housing and the outer housing of the plug connection without interconnecting the motor housing and the outer housing of the plug connection.

2. The combination of the motor housing and the plug connection as claimed in claim 1, wherein the at least one elongate projection is designed as at least one rib.

3. The combination of the motor housing and the plug connection as claimed in claim 2, wherein the at least one rib extends in a direction in which the plug connection is inserted into the motor housing when it is mounted on the latter.

4. The combination of the motor housing and the plug connection as claimed in claim 1, wherein the at least one elongate projection is designed as a single piece with the motor housing.

5. The combination of the motor housing and the plug connection as claimed in claim 1, wherein the at least one elongate projection provides a force-fit between the motor housing and the plug connection.

6. The combination of the motor housing and the plug connection as claimed in claim 1, wherein the at least one elongate projection provides a form-fit between the motor housing and the plug connection.

7. A motor housing with at least one projection which is designed such that the motor housing can be used as a component of the combination of the motor housing and the plug connection defined in claim 1.

8. The combination of a motor housing and a plug connection as claimed in claim 1, wherein the movable components of a vehicle comprise at least one of a sun roof, a blind, and a convertible roof.

9. The combination of a motor housing and a plug connection as claimed in claim 1, wherein the at least one elongate projection provides a bearing point over its entire length.

10. The combination of a motor housing and a plug connection as claimed in claim 1, wherein the plug connection comprises a circumferential housing.

11. The combination of a motor housing and a plug connection as claimed in claim 1, wherein the at least one elongate projection slidably bears on and distributes force between the motor housing and a flat surface of the outer housing of the plug connection.

* * * * *